(12) United States Patent
Samie

(10) Patent No.: US 9,271,484 B2
(45) Date of Patent: Mar. 1, 2016

(54) BOBBIN HOLDER FOR TYING THREAD FOR MAKING FISHING FLIES AND METHOD FOR FASTENING DUBBING USING THIS BOBBIN HOLDER

(71) Applicant: Didier Samie, Geispolsheim (FR)

(72) Inventor: Didier Samie, Geispolsheim (FR)

(*) Notice: Subject to any disclaimer, the term of this patent is extended or adjusted under 35 U.S.C. 154(b) by 141 days.

(21) Appl. No.: 14/037,067

(22) Filed: Sep. 25, 2013

(65) Prior Publication Data

US 2014/0082993 A1    Mar. 27, 2014

Related U.S. Application Data

(60) Provisional application No. 61/733,153, filed on Dec. 4, 2012.

(30) Foreign Application Priority Data

Sep. 25, 2012  (FR) ..................... 12 58980

(51) Int. Cl.
  *A01K 97/26*    (2006.01)
(52) U.S. Cl.
  CPC ..................... *A01K 97/26* (2013.01)
(58) Field of Classification Search
  CPC ..................................... A01K 97/26
  See application file for complete search history.

(56) References Cited

U.S. PATENT DOCUMENTS

|   |   |   |   |   |
|---|---|---|---|---|
| 31,960 | A | * | 4/1861 | Forest .......................... 242/153 |
| 2,220,878 | A | * | 11/1940 | Harvey ...................... 242/422.4 |
| 2,338,353 | A | * | 1/1944 | Perkins ......................... 242/442 |
| 2,419,241 | A | * | 4/1947 | Wingate ........................ 242/442 |
| 2,464,542 | A | * | 3/1949 | Zarrs ............................. 242/140 |
| 2,478,255 | A | * | 8/1949 | Drow ........................ 242/137.1 |
| 2,479,710 | A | * | 8/1949 | Arnold ...................... 242/137.1 |
| 2,487,625 | A | * | 11/1949 | Witkovic ................. 242/129.53 |
| 2,578,045 | A | * | 12/1951 | Conrad et al. ........... 242/129.53 |
| 2,635,832 | A | | 4/1953 | Richmond |
| 2,659,548 | A | * | 11/1953 | Morgester ................ 242/129.53 |
| 3,942,736 | A | * | 3/1976 | Ramos ....................... 242/588.1 |
| 4,008,913 | A | | 2/1977 | Cole |
| 4,088,275 | A | * | 5/1978 | Ramos .......................... 242/419 |
| 4,184,645 | A | * | 1/1980 | Starling ........................ 242/441 |
| 4,189,111 | A | * | 2/1980 | Doiron .......................... 242/140 |

(Continued)

FOREIGN PATENT DOCUMENTS

FR    2770968 A1    5/1999
JP    2002-315492 A    10/2002

OTHER PUBLICATIONS

French Search Report dated Jun. 5, 2013, issued in corresponding French application No. FR 1258980.

(Continued)

*Primary Examiner* — Shaun R Hurley
(74) *Attorney, Agent, or Firm* — Westerman, Hattori, Daniels & Adrian, LLP

(57) ABSTRACT

A bobbin holder (2) for tying thread (F) for making fishing flies comprises, essentially, means (21) for holding a bobbin (3) of tying thread (F) and a thread (F) guide tube (20) through which the thread (F) from the said bobbin (3) is threaded. The bobbin holder (2) also comprises, spaced radially in relation to the thread (F) guide tube (20) and apart from each (4; 4') other (4'; 4), at least two retaining hooks (4; 4') around which a tying thread (F) can be partially wound. The bobbin holder is used for fastening dubbing onto the fish hook of a fishing fly.

20 Claims, 4 Drawing Sheets

(56) References Cited

U.S. PATENT DOCUMENTS

| | | | | |
|---|---|---|---|---|
| 4,418,875 | A | * | 12/1983 | Brine .......................... 242/442 |
| D275,593 | S | * | 9/1984 | Carter ......................... D22/134 |
| 4,870,772 | A | | 10/1989 | Johns |
| 5,076,510 | A | * | 12/1991 | Norlander .................. 242/422.4 |
| 5,884,954 | A | * | 3/1999 | Trozera ........................ 294/100 |
| 6,179,240 | B1 | * | 1/2001 | Todd ............................ 242/442 |
| 6,474,584 | B2 | * | 11/2002 | Ekich ............................ 242/371 |
| 6,527,217 | B1 | * | 3/2003 | Lyons ......................... 242/423.2 |
| 6,578,787 | B2 | * | 6/2003 | Yonenoi ..................... 242/419.4 |
| 2001/0042296 | A1 | * | 11/2001 | Yonenoi ......................... 29/450 |
| 2002/0113159 | A1 | * | 8/2002 | Ekich ............................ 242/442 |
| 2005/0229577 | A1 | * | 10/2005 | Zauner et al. .................... 57/24 |

OTHER PUBLICATIONS

Post by Vonbur dated Apr. 25, 2011—12:18pm, in "Bobbin weight: is less more?", Fly Tying—Fly Tying Forums—The Fly Tying Bench, http://www.flytyingforum.com/index.php?showtopic=59363 (retrieved from the Internet Oct. 19, 2015) pp. 3-5 (total 7 pages); in English.

* cited by examiner

BOBBIN HOLDER FOR TYING THREAD FOR MAKING FISHING FLIES AND METHOD FOR FASTENING DUBBING USING THIS BOBBIN HOLDER

The invention relates to a bobbin holder for tying thread for making fishing flies. This invention also relates to a device for holding tying thread for such a bobbin holder. Finally, the invention also relates to a method for fastening dubbing onto the fish hook of a fishing fly.

This invention applies to the field of fishing tackle and, more particularly, to the field of tools serving to make artificial flies used as fishing lures.

BACKGROUND ART

Fly fishing is considered as a sport. The principle consists of casting a specific type of fishing rod and placing on or in the water an artificial fly, to lure a fish.

If it is possible to create, using many and varied types of material, flies of different shapes, sizes and/or colours, the principle behind making these flies is virtually always the same.

More particularly, a tying thread is used, which helps to fasten onto the shank of a fish hook the different materials entering into the composition of an artificial fly, notably those simulating the body, wings, legs etc. of such a fly.

In particular, to make the body of such a fly, a product named dubbing is used, which includes hairs (particularly animal hairs) and/or fibres (synthetic, natural, of plant or animal origin), which is twisted into the tying thread, in order to make a dubbing rope intended to be wound round the shank of the fish hook.

Very concretely, after attaching the end of the tying thread to the fish hook, a loop is formed, particularly with this tying thread or another tying thread, between whose strands the dubbing is placed.

Very often, to ensure the adherence of the dubbing hairs and/or fibres to just these two strands of the loop, it is a known procedure to coat these strands with dubbing wax.

The dubbing and the strands of the loop are then twisted using a specially designed tool, usually known as a "dubbing twister", which comprises a handle from which extend two metal prongs each ending in a hook, which is engaged in the loop.

This tool has the dual function of holding the loop open to insert the dubbing, then, by turning the handle, twisting the strands of the loop around this dubbing, in order to obtain a dubbing rope. The same tool then enables the dubbing rope obtained in this way to be wound around the shank of the fish hook. By winding the tying thread in a spiral around the assembly formed by the shank and the dubbing rope, the dubbing rope is secured in position around this shank.

As can be seen from reading the foregoing description, a specific tool is necessary to provide these two functions consisting, on the one hand, of twisting the dubbing and the strands of the loop and, on the other hand, of winding the dubbing rope thus obtained onto the shank.

As mentioned above, to make a fly, the user uses a tying thread which is taken, in fact, from a bobbin of thread, which the user uses a bobbin holder to hold. Essentially, this bobbin holder comprises, on the one hand, a guide tube for the tying thread, through which this tying thread passes, and on the other hand, a gripping device, generally extending from the said thread guide tube, and comprising two branches between which the bobbin is held.

The function of this bobbin holder is to hold the bobbin so that it can freely rotate whilst being braked at the same time, in such a way as to enable the tying thread to unwind progressively during the different stages of making the fly.

Consequently, when designing the fly body and therefore when fastening the dubbing onto the hook shank, the operator must handle separately the bobbin holder on the one hand, and the "dubbing twister" on the other.

Some have already imagined a bobbin holder able to fulfil the two above-mentioned purposes (holding the loop open to insert the dubbing and twisting the strands of the loop around this dubbing). Thus it is known that a small hook, which is axially mobile on the thread guide tube, can be fitted which the user can engage in the loop, after inserting the dubbing in between the two strands of this loop.

By turning the bobbin holder, it is possible, by means of the latter, to twist not only the two strands of the loop, but also the main tying thread around the dubbing. As in the previous solution, the dubbing rope thus formed, is then wound round the hook shank. Once this operation has been done, the small hook can be unhooked from the loop, which allows the main tying thread to be released.

SUMMARY OF THE INVENTION

In each of the solutions of the prior art described above, it is necessary, once the loop is closed, to insert the dubbing between just the two strands of this loop and to hold this dubbing in position until the dubbing and at least the strands of this loop and in some cases also the tying thread have been twisted together. Obviously, the dubbing can only be inserted into the loop by holding the loop open at the same time, either by means of the hooks on the "dubbing twister", or by the manual dexterity of the operator.

Another disadvantage of the solution consisting of using the bobbin holder as a means for twisting consist in the fact that, once the dubbing rope has been wound round the shank and the loop released from the small hook, a certain amount of dexterity is required to untwist the strands of the loop of main twisting thread over any excess length of the dubbing rope.

Indeed, it is necessary to cut off this excess length of dubbing rope. And yet at the same time, it is necessary to avoid cutting the tying thread during this operation.

The aim of this invention is to overcome all the disadvantages of these earlier solutions.

It is as part of a first inventive step that it has been imagined, not only to use the bobbin holder as a means of twisting the thread, but, in addition, to define, with the main tying thread, not only a simple loop to hold the dubbing, but a volume in which it becomes very easy to engage and retain the dubbing.

Finally, this creation of a volume not only facilitates the placing of the dubbing, but also avoids the use of dubbing wax necessary to hold the dubbing in position in relation to the strands of the loop.

As will become clear in the description that follows, this invention also brings other practical advantages, resulting from the use of the bobbin holder according to the invention, as well as during the use of a method for fastening the dubbing onto a fish hook in which this bobbin holder is used. In particular, this method for fastening the dubbing does not require as high a degree of dexterity as that required in the methods described above.

In fact, this invention relates to a bobbin holder for tying thread for making fishing flies, said bobbin holder comprising, essentially, means for holding a bobbin of tying thread and a thread guide tube through which the thread from the said bobbin is threaded. This bobbin holder is characterised by the fact that it also comprises, spaced radially in relation to the thread guide tube and apart from each other, at least two retaining hooks around which a tying thread can be partially wound.

The invention also relates to a method for fastening dubbing onto the fish hook of a fishing fly, said method involving:
  attaching to the fish hook a main tying thread unwound from a bobbin holder according to any one of the preceding claims;
  using the same main tying thread or another tying thread, forming a loop and fastening a first end of this loop onto the fish hook, substantially in the same area as that from which the main tying thread extends;
  passing a second end of the loop, the opposite end to the first end of the loop fastened onto the fish hook, through the two hooks on the bobbin holder, which enables, on the one hand, the loop to be held partly open and, on the other hand, the two strands of the loop and the main tying thread to define a substantially trihedral volume;
  inserting some dubbing into the trihedral volume;
  by rotating the bobbin holder substantially around the axis of the main thread guide tube, twisting this main tying thread, the two strands of the loop and the dubbing together, in order to form a dubbing rope that is then wound around the fish hook;
  unhooking the loop from the two hooks in order to release the main tying thread.

Thus, according to the invention, the bobbin holder comprises at least two hooks, radially spaced in relation to the thread guide tube, and positioned apart from each other. Such a configuration of the hooks makes it possible, advantageously, to hold the loop open, which facilitates the gripping of this loop in order to unhook it easily.

BRIEF DESCRIPTION OF THE DRAWINGS

Other purposes and benefits of this invention will become clear in the course of the description that follows relating to embodiments which are given by way of indicative but not limitative examples.

The comprehension of said description will be facilitated by referring to the drawings enclosed, in which.

DETAILED DESCRIPTION OF PARTICULAR EMBODIMENTS

Figure 1:
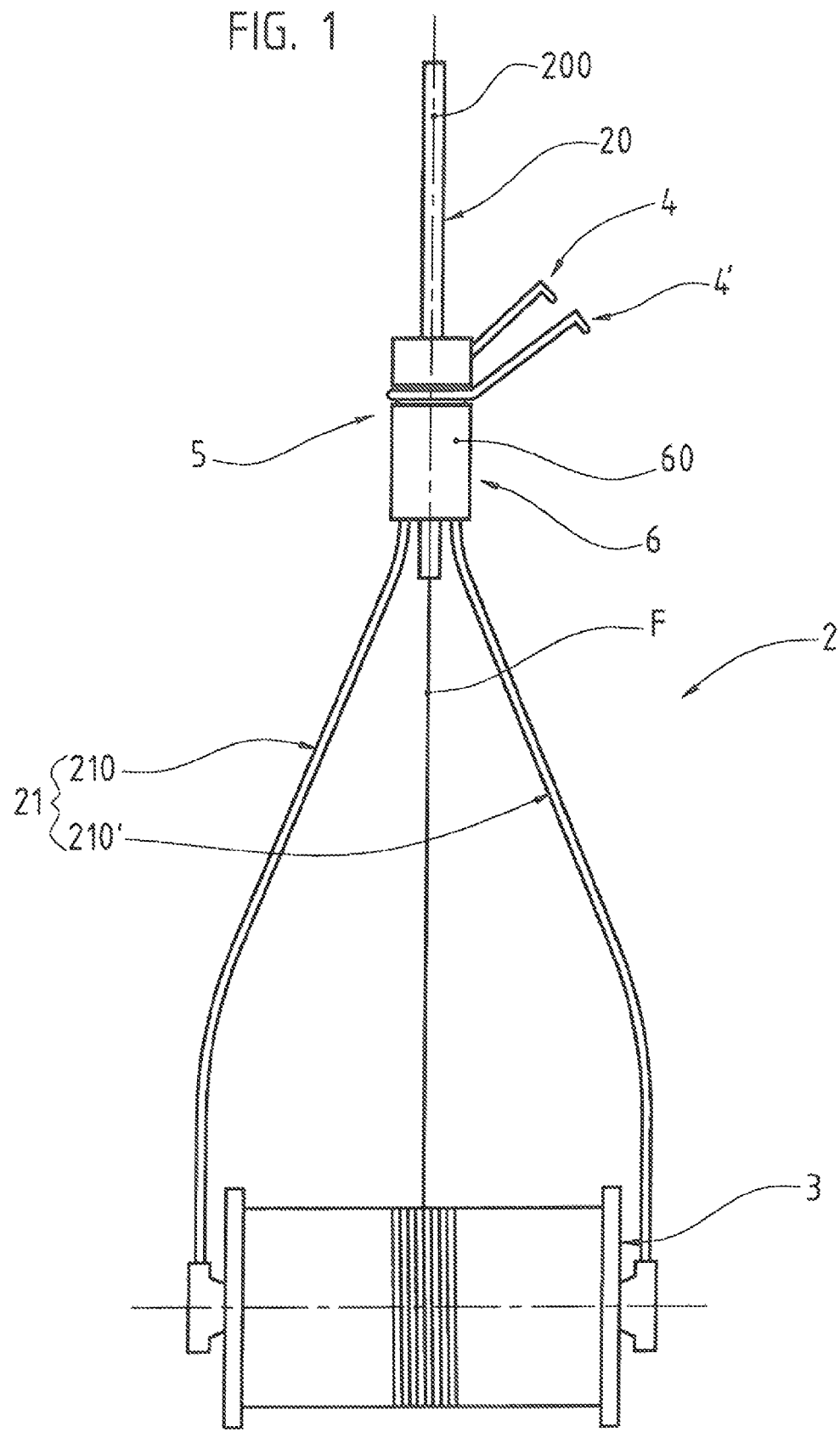
FIG. 1 is a schematic view of the bobbin holder, according to the invention, holding a bobbin of tying thread.

This invention relates to the field of fishing tackle and, more particularly that of tools serving to make artificial flies used as lures in fly fishing.

In this respect, it will be noted that such a fly 1 comprises at least a fish hook 10 comprising at least a shank 11 as well as a bend 12, extending in continuation of such a shank 11, and prolonged by at least a point, completed in particular by a barb.

Such a fly 1 also comprises some dubbing 13 simulating the body of an insect (more particularly a fly), and at least a part consisting of hairs (particularly animal hairs) and/or fibres (synthetic, natural, of plant or animal origin). This dubbing 13 is twisted inside at least one tying thread F, in order to constitute a dubbing rope 14, that is part of the fly 1, and that is wound round the shank 11 of the fish hook 10.

In fact, the invention relates to a bobbin holder 2 designed to hold a bobbin 3 of tying thread F for making such a fishing fly 1.

In a manner known per se, such a bobbin holder 2 comprises a tube 20 for guiding the tying thread F. This guide tube 20 extends along an axis 200, has the tying thread F threaded through it and is interposed between the bobbin 3 and the fish hook 10. It is, more particularly, to this fish hook 10 that the tying thread F is fastened, which then connects the bobbin 3 and the fish hook 10 and, in the rest of the description, will be identified as the main tying thread Fp.

This guide tube 20 may be made, at least partly, from metal, ceramic or another material. A particular embodiment consists of this guide tube 20 being made of metal and including, inside, a ceramic coating which avoids the metal being worn by the tying thread F.

This bobbin holder 2 also comprises means 21 for holding a bobbin 3 of tying thread F. In fact, these holding means 21 are designed to hold the bobbin 3 so that it can freely rotate whilst being braked at the same time, in such a way as to enable the tying thread F to unwind progressively during the different stages of making the fly 1.

In fact, such holding means 21 may comprise at least one branch with a first end that is attached to the guide tube 20 and a second, free end, designed to cooperate with the bobbin 3 of thread. A first embodiment consists of these holding means 21 comprising a single branch.

However, and in another embodiment illustrated in the figures enclosed, these holding means 21 take the form of a gripping assembly with two branches (210; 210'). These two branches (210; 210') each have, on the one hand, a first end attached (directly or indirectly) to the guide tube 20 and, on the other hand, a second, free end designed to cooperate with the bobbin 3 of thread, so that said bobbin 3 is gripped between the free ends of these two branches (210; 210') of the gripping assembly as shown in FIG. 1.

According to the invention, this bobbin holder 2 comprises at least two retaining hooks (4; 4'), radially spaced in relation to the thread F guide tube 20, and positioned apart from each (4; 4') other (4'; 4).

It is around these retaining hooks (4; 4') that a tying thread F can be partially wound.

In this respect, it will be noted that such a tying thread F may consist of the main tying thread Fp mentioned above or of another tying thread F.

In fact, this tying thread F is arranged so as to define a loop B comprising at least two strands, which can each be partially wound around such a retaining hook (4; 4'). The radial spacing and positioning of these retaining hooks (4; 4') then enable the loop B to be held open and away from the guide tube 20.

It will be noted that such a loop B (more particularly each strand of this loop) has one end which is fastened onto the fish hook 10, substantially in the same area as that from which the main tying thread Fp extends.

This results in this tying thread F and these two strands of the loop B defining a trihedron whose summit is constituted by the point at which this main tying thread Fp and/or this loop B is fastened onto the fish hook 10.

This trihedron defines a volume inside which the dubbing 13 is placed (more particularly through the loop B), in order to make the dubbing rope 14 mentioned above.

As mentioned above, the tying thread F (more particularly the loop B defined by this tying thread F) is partially wound round the retaining hooks (4; 4').

In this respect, it will be noted that each retaining hook (4; 4') then comprises a proximal zone 40, corresponding to the area of such a hook (4; 4') which is closest to the guide tube 20, and with which 40 the tying thread F of the loop B will come into contact.

In this proximal contact zone 40, the tangent Tp to the hook (4; 4') extends in a direction that forms, in relation to the axis 200 along which the guide tube 20 extends, an angle of between 20° and 60° inclusive, and preferably between 30° and 45° inclusive.

Such a feature enables, advantageously, the tying thread F (and therefore the loop B) always to be pushed to the back of a recess defined by such a retaining hook (4; 4') and to be held away from the guide tube 20, before and (more particularly) during the formation of the dubbing rope 14 during which operation this tying thread F will tend to move closer to this guide tube 20.

Another feature consists of each retaining hook (4; 4') comprising a distal zone 41, corresponding to the area of such a hook (4; 4') which is furthest away from the guide tube 20, and with which 41 the tying thread F of the loop B will come into contact.

In this distal contact zone 41, the tangent Td to the hook (4; 4') extends in a direction that forms, in relation to the axis 200 along which the guide tube 20 extends, an angle of between 5° and 20° inclusive, and preferably between 10° and 15° inclusive.

Such a feature enables, advantageously, the tying thread F (and therefore the loop B) always to be pushed to the back of a recess defined by such a retaining hook (4; 4'), to be held away from the guide tube 20, and to be held attached to the retaining hook (4; 4'), after the formation of the dubbing rope 14 and when manipulating the bobbin holder 2 prior to releasing the trying thread F (more particularly the loop B) from the retaining hooks (4; 4').

In fact, as will be described in more detail in the rest of the description, during such an operation, the bobbin holder 2 can be inclined in relation to the direction of extension of a portion of the main tying thread Fp extending between the bobbin holder 2 and the fish hook 10.

However, and in another embodiment, during such an operation, it is possible to deform a deformable part of this bobbin holder 2. In this respect, it will be noted that the bobbin holder 2 then comprises at least one deformable part which may consist of at least one of the retaining hooks (4; 4') (more particularly the distal part 41 of such a hook) and/or of a member, described below and which is part of this bobbin holder 2.

Another feature is that such a retaining hook (4; 4') may be made of a material facilitating the sliding of the tying thread F and/or be coated with such a material. A particular embodiment consists of such a hook (4; 4') being made of metal with a ceramic coating.

As mentioned above, the tying thread F guide tube 20 extends along an axis 200. This axis 200 intersects (more particularly perpendicularly) with a plane, on the one hand in which the retaining hooks (4; 4') extend and, on the other hand, in which this axis 200 and these retaining hooks (4; 4') are arranged so as to occupy the summits of a triangle.

Another feature of the invention consists of the bobbin holder 2 comprising means 5 for assembling the retaining hooks (4; 4') onto the tying thread F guide tube 20.

In a first embodiment not shown, these means 5 for assembling the retaining hooks (4; 4') onto the guide tube 20 consist of means for fastening these hooks (4; 4') directly onto the guide tube 20, more particularly by welding, gluing, pressing or another method.

In another embodiment, these means 5 for assembling the retaining hooks (4; 4') onto the guide tube 20 comprise a support 6, through which the guide tube 20 passes and comprising at least the said retaining hooks (4; 4'), and possibly also at least one member (an arm or similar) comprising at least one such hook (4; 4'). These assembly means 5 may then take the form of a single part comprising the support 6 and the hooks (4; 4'), and possibly also the member or members comprising at least one such hook (4; 4'). Such a single part may be made of resin and/or by injection moulding.

Figure 2:
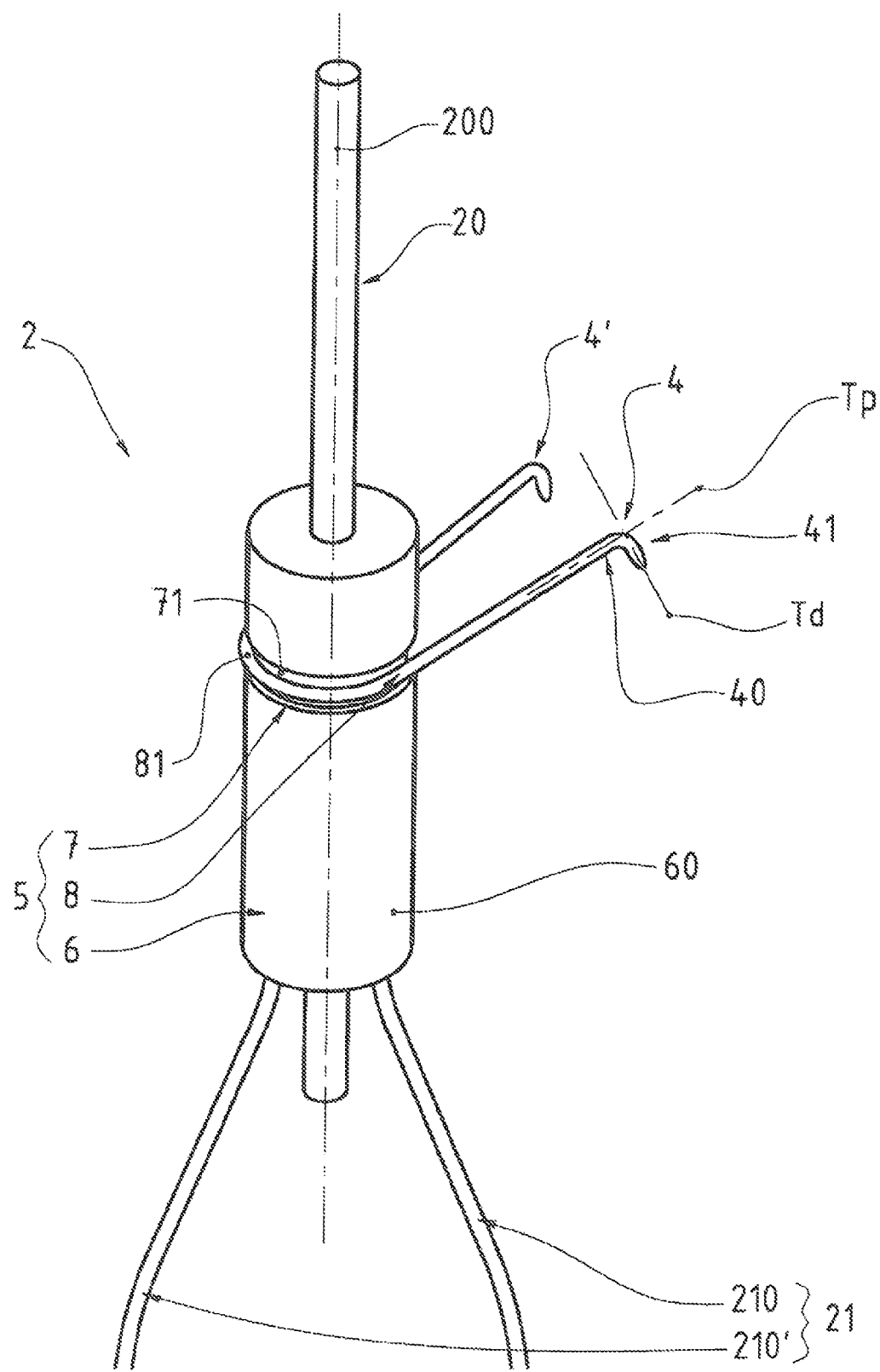
FIG. 2 is a schematic view of a detail of the bobbin holder according to the invention illustrated in FIG. 1, and corresponding to a first embodiment, shown in a position for making dubbing.
Figure 3:
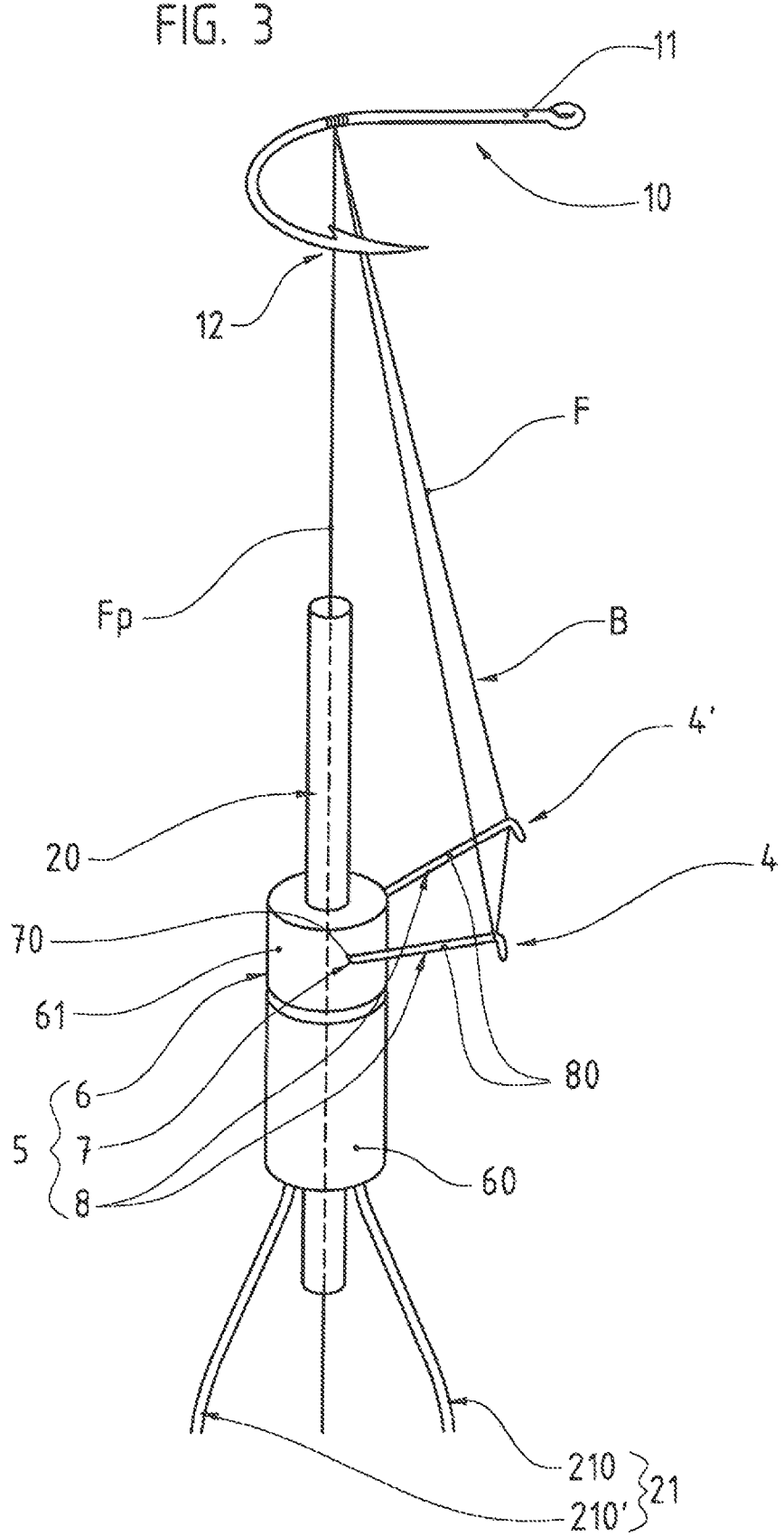
FIG. 3 is a similar view to FIG. 2 corresponding to a second embodiment.
Figure 4:
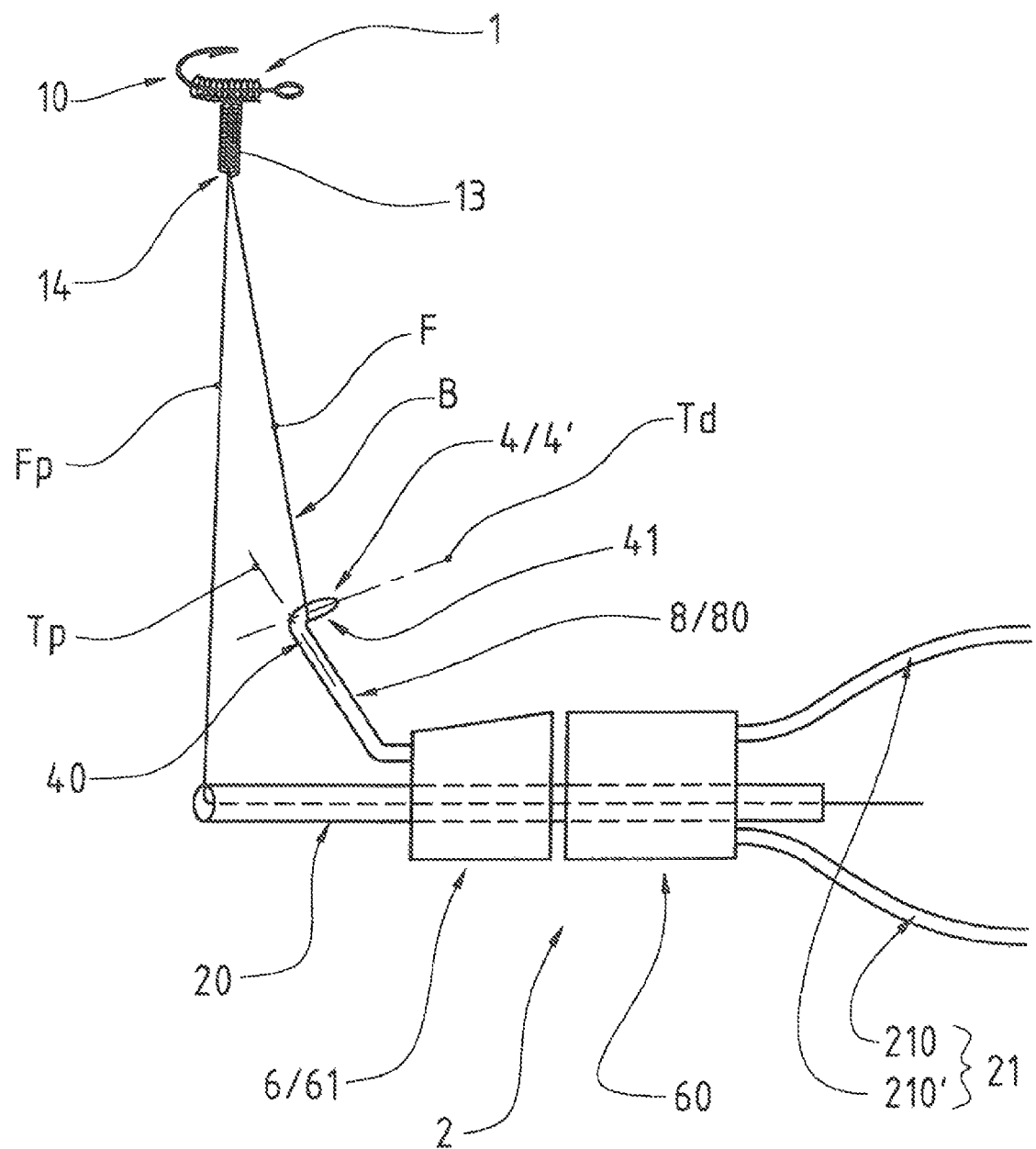
FIG. 4 is a schematic view of a detail of the bobbin holder according to the invention illustrated in FIG. 1, shown in a position for fastening the dubbing onto a fish hook.

However, and as illustrated in FIGS. 2 to 4, these means 5 for attaching the retaining hooks (4; 4') comprise, on the one hand, a support 6 through which the guide tube 20 passes, and on the other hand, means 7 that are part of the support 6, and which are designed each to receive at least one retaining hook (4; 4') or at least one member 8 comprising at least one such retaining hook (4; 4').

Thus, the means 5 for assembling the retaining hooks (4; 4') onto the guide tube 20 comprise a support 6.

According to a first feature, this support 6 and this guide tube 20 are preferably coaxial.

In a first embodiment of the invention illustrated in FIGS. 1 and 2, this support 6 consists of a sleeve 60, on the one hand, to which are attached the means 21 for holding a bobbin 3 of thread (more particularly the first end of the two branches of the gripping assembly constituting these means 21) and, on the other hand, through which the tying thread F guide tube 20 passes (preferably coaxially).

However, and in a second embodiment illustrated in FIG. 3, this support 6 comprises a ring 61 fitted (preferably coaxially) around the guide tube 20.

In this respect, it will be noted that such a ring 61 may be at least partly closed.

Thus and in a first embodiment, such a ring 61 may have a radial opening so as to form a clip intended to be clipped (in particular laterally) onto the guide tube 20. Such a clip may remain open or be closed over the guide tube 20, more particularly using means (a closable flap) that are part of this clip and/or using means external to this clip, in particular by means of the member 8 mentioned above.

Another embodiment consists of this ring 61 being fully closed.

As mentioned above, the means 5 for assembling the retaining hooks (4; 4') onto the guide tube 20 also comprise means 7 for receiving a member 8 comprising at least one retaining hook (4; 4').

In a first embodiment, these receiving means 7 consist of at least a hole 70 in the support 6, more particularly in the sleeve 60 (not shown) or the ring 61 (FIG. 3). In the case of such means 7 taking the form of a hole 70, the member 8 comprising at least one retaining hook (4; 4') consists of a prong 80.

In fact, such a prong 80 comprises, on the one hand, a first end engaged in such a hole 70 and, on the other hand, a retaining hook (4; 4') at (preferably) the second end of this prong 80, the opposite end to the said first end.

Such a prong 80 then extending laterally (and in particular radially) in relation to the guide tube 20.

In a second embodiment, the member 8, comprising at least one retaining hook (4; 4'), consists of a U-shaped member 81 with two branches each comprising a retaining hook (4, 4'), at (preferably) one free end of such a branch (FIG. 2). Such a branch then extending laterally (and in particular radially) in relation to the guide tube 20.

In the case of such a member 8 in the form of a U-shaped member 81, the means 7 for receiving such a member 8 consist of a groove 71 inside which the said U-shaped member 81 is engaged. It will be noted that it is, more particularly, the outer wall of this support 6 that contains such a groove 71.

As far as the said member 8 is concerned, the latter may be made of metal, resin or another material. Once again, such a member 8 may have a coating (in particular a ceramic coating) facilitating the sliding of the tying thread F.

As mentioned above, the bobbin holder 2 comprises means 5 for assembling the retaining hooks (4; 4') onto the tying thread F guide tube 20.

In this respect, it will be noted that in a first type of embodiment of the invention, these means 5 are designed to assemble the retaining hooks (4; 4') onto the guide tube 20 in a fixed manner.

However, and in a preferred embodiment of the invention, these means 5 for assembling the retaining hooks (4; 4') onto the tying thread F guide tube 20 are designed to fit these hooks (4; 4') so that they may rotate around the axis 200 along which this guide tube 20 extends.

Also and in a first embodiment, the support 6 (in the form of a sleeve 60 or a ring 61, as the case may be) is fixed in relation to the guide tube 20 whilst the U-shaped member 81 is mobile in relation to this support 6, more particularly by being held rotatably inside the groove 71 in this support 6.

In a second embodiment, the ring 61 (constituting the support 6) is mobile in relation to the guide tube 20 whilst the retaining hooks (4; 4') are fixed in relation to the ring 61. In such a case, it is, more particularly, the member 8 (in the form of a prong 80 or a U-shaped member 81) which is then fixed in relation to this ring 61.

The presence of these means 5 for assembling the retaining hooks (4; 4') rotatably around the guide tube 20 makes it possible, advantageously, to wind the dubbing rope 14 around the shank 11 of the fish hook 10, by conferring upon the bobbin holder a spiral movement around the shank 11, during which movement this bobbin holder 2 adopts a position in which the axis 200 of the guide tube 20 is parallel to the direction of extension of the shank 11.

An additional feature of the invention consists of the bobbin holder 2 comprising means for limiting the rotation of the retaining hooks (4; 4') in relation to the axis 200 of the guide tube 20.

In a first embodiment, these means for limiting the rotation consists of the U-shaped member 81 (constituting the said member 8) and/or the groove 71 (constituting the means 7 for receiving such a member 8) which are configured in such a way as to ensure a tight assembly, but one which nevertheless allows the possibility of this U-shaped member 81 rotating inside this groove 71.

Another embodiment consists of these means for limiting the rotation consisting of a spring blade or a foam insert interposed between the mobile ring 61 (constituting the support 6) and the guide tube 20.

The presence of these means for limiting the rotation makes it possible, advantageously, to form the dubbing rope 14 by having the bobbin holder 2 adopt a rotational movement around the axis 200 of the guide tube 20, during which movement the retaining hooks (4; 4') are rotated.

This invention also relates to a method for fastening dubbing 13 onto the fish hook 10 of a fishing fly 1.

According to the invention, said method involves:

attaching to the fish hook 10 (more particularly the shank 11 of this fish hook 10) a main tying thread Fp unwound from a bobbin holder 2 with the characteristics described above;

using the same main tying thread Fp or another tying thread F, forming a loop B and fastening a first end of this loop B onto the fish hook 10 (more particularly the shank 11 of this fish hook 10), substantially in the same area as that from which the main tying thread Fp extends;

passing a second end of the loop B, the opposite end to the first end of the loop B fastened onto the fish hook 10, through the two hooks (4; 4') on the bobbin holder 2, which enables, on the one hand, the loop B to be held partly open and, on the other hand, the two strands of the loop B and the main tying thread Fp to define a substantially trihedral volume;

inserting some dubbing 13 into the trihedral volume;

by rotating the bobbin holder 2 substantially around the axis 200 of the main thread Fp guide tube 20, twisting this main tying thread Fp, the two strands of the loop B and the dubbing 13 together, in order to form a dubbing rope 14 that is then wound around the fish hook 10;

unhooking the loop B from the two hooks (4; 4') in order to release the main tying thread Fp.

Prior to implementing this method, it is necessary to mount the fish hook 10 on a support, more particularly by clamping this hook 10 in the jaws of a vice.

In a first embodiment, corresponding, more particularly, to a bobbin holder 2 where the retaining hooks (4; 4') are fixed in relation to the guide tube 20, the dubbing rope 14 is wound round a shank 11 which is part of the fish hook 10 by having the bobbin holder 2 adopt a spiral movement around the shank 11 of the fish hook 10, in such a way that the axis 200 of the guide tube 20 is substantially perpendicular to the direction in which the shank 11 of the fish hook 10 extends.

However, and in a preferred embodiment corresponding to a bobbin holder 2 where the retaining hooks (4; 4') are rotatably mobile in relation to the guide tube 20, the dubbing rope 14 is wound round a shank 11 which is part of the fish hook 10 by having the bobbin holder 2 adopt a spiral movement around the shank 11 of the fish hook 10, in such a way that the axis 200 of the guide tube 20 is substantially parallel to the direction in which the shank 11 of the fish hook 10 extends. This embodiment considerably facilitates the winding of the dubbing rope 14 around the shank 11 of the fish hook 10

According to another feature of this method, when the loop B is unhooked from the two hooks (4; 4'), the bobbin holder 2 is inclined in relation to the direction of extension of a portion of main tying thread Fp extending between this bobbin holder 2 and the fish hook 10.

In fact, this bobbin holder 2 is inclined so that the axis 200 of the guide tube 20 forms, with this direction, an angle of between 70° and 110° inclusive (and preferably of the order of) 90° and/or so that, in the distal contact zone 41 between the hook (4; 4') and the tying thread F of the loop B, the tangent Td to the hook (4; 4') extends in a direction forming, in relation to the main tying thread Fp, an angle of between 65° and 90° (and preferably between 75° and 80° inclusive).

This feature makes it possible, advantageously, and as a result of the angle of this tangent Td in relation to the axis 200 of the guide tube 20 as described above, on the one hand, for the tying thread F (and therefore the loop B) always to be pushed to the back of the recess defined by such a retaining hook (4; 4'), to be held away from the guide tube 20, and to be held attached to the retaining hook (4; 4'), after the formation of the dubbing rope 14 and during an operation to incline the bobbin holder 2 prior to unhooking the tying thread F (more particularly the loop B) from the retaining hooks (4; 4') and, on the other hand, to facilitate the releasing of the loop B when the bobbin holder 2 is in the inclined position.

However, and in another embodiment, when the loop B is unhooked from the two hooks (4; 4'), a deformable part of the bobbin holder 2 is deformed, a part consisting more particularly of at least one of the retaining hooks (4; 4') (more particularly the distal part 41 of such a hook) and/or the said member (arm, prong 80, U-shaped member 81, more particularly a branch of this U-shaped member 81).

The presence of this deformable part makes it possible to facilitate the releasing of the loop B, when the bobbin holder 2 (more particularly the guide tube 20) extends in a direction of extension corresponding to that of a portion of main tying thread Fp extending between this bobbin holder 2 and the fish hook 10. Such an embodiment then advantageously avoids the need to incline the bobbin holder 2.

The invention claimed is:

1. Bobbin holder for tying thread for making fishing flies, said bobbin holder comprising:
    means for holding a bobbin of tying thread and a thread guide tube through which the thread from the said bobbin is threaded, and
    at least two retaining hooks, each of the two retaining hooks being radially spaced in relation to the thread guide tube, and the two retaining hooks being spaced apart from each other, so that a tying thread can be partially wound around the two retaining hooks,
    wherein an axis along which the thread guide tube extends intersects with a plane in which the retaining hooks are arranged so as to occupy the summits of a triangle.

2. Bobbin holder according to claim 1, wherein each retaining hook comprises a proximal contact zone with which the tying thread will come into contact and, in the proximal contact zone, the tangent to the hook extends in a direction forming, in relation to the axis along which the thread guide tube extends, an angle of between 20° and 60° inclusive.

3. Bobbin holder according to claim 1, wherein each retaining hook comprises a distal contact zone with which the tying thread will come into contact and, in the distal contact zone, the tangent to the hook extends in a direction forming, in relation to the axis along which the thread guide tube extends, an angle of between 5° and 20° inclusive.

4. Bobbin holder according to claim 1, which comprises means for assembling the retaining hooks onto the thread guide tube.

5. Bobbin holder according to claim 4, wherein the assembly means comprise, either a support, through which the thread guide tube passes and comprising at least the said retaining hooks, or a support, through which the thread guide tube passes as well as means that are part of the said support and which are each designed to receive at least one retaining hook or at least one member comprising at least one retaining hook.

6. Bobbin holder according to claim 5, wherein the support comprises a ring with a radial opening so as to form a clip intended to be clipped onto the thread guide tube.

7. Bobbin holder according to claim 4, which comprises means for assembling the retaining hooks onto the thread guide tube, rotatably around the axis along which the thread guide tube extends.

8. Bobbin holder according to claim 7, which comprises means for limiting the rotation of the retaining hooks in relation to the axis along which the thread guide tube extends.

9. Method for fastening dubbing onto the fish hook of a fishing fly, said method involving:
    attaching to the fish hook a main tying thread unwound from a bobbin holder according to claim 1;
    using the same main tying thread or another tying thread, forming a loop and fastening a first end of the loop onto the fish hook, substantially in the same area as that from which the main tying thread extends;
    passing a second end of the loop, the opposite end to the first end of the loop fastened onto the fish hook, through the two hooks on the bobbin holder, which enables (i) the loop to be held partly open and (ii) the two strands of the loop and the main tying thread to define a substantially trihedral volume;
    inserting some dubbing into the trihedral volume;
    by rotating the bobbin holder substantially around the axis of the thread guide tube, twisting the main tying thread, the two strands of the loop and the dubbing together, in order to form a dubbing rope that is then wound around the fish hook;
    unhooking the loop from the two hooks in order to release the main tying thread.

10. Method for fastening dubbing on a fish hook according to claim 9, wherein the dubbing rope is wound round a shank that is part of the fish hook by having the bobbin holder adopt a spiral movement around the shank of the fish hook, in such a way that the axis of the thread guide tube is substantially perpendicular or parallel to the direction in which the shank of the fish hook extends.

11. Method for fastening dubbing on a fish hook according to claim 9, wherein, when the loop is unhooked from the two hooks, either a deformable portion of the bobbin holder is deformed, or the bobbin holder is inclined in relation to a direction of extension of a portion of main tying thread extending between the bobbin holder and the fish hook, so that at least one of (i) the axis of the thread guide tube forms, with the direction of extension of the portion of main tying thread, an angle of between 70° and 110° inclusive, and (ii) in the distal contact zone between the hook and the tying thread of the loop, the tangent to the hook extends in a direction forming, in relation to the main tying thread, an angle of between 65° and 90° inclusive.

12. Method for fastening dubbing on a fish hook according to claim 10, wherein, when the loop is unhooked from the two hooks, either a deformable portion of the bobbin holder is deformed, or the bobbin holder is inclined in relation to a direction of extension of a portion of main tying thread extending between the bobbin holder and the fish hook, so that at least one of (i) the axis of the thread guide tube forms, with the direction of extension of the portion of main tying thread, an angle of between 70° and 110° inclusive, and (ii) in the distal contact zone between the hook and the tying thread of the loop, the tangent to the hook extends in a direction forming, in relation to the main tying thread, an angle of between 65° and 90° inclusive.

13. Bobbin holder according to claim 2, wherein each retaining hook comprises a distal contact zone with which the tying thread will come into contact and, in the distal contact zone, the tangent to the hook extends in a direction forming, in relation to the axis along which the thread guide tube extends, an angle of between 5° and 20° inclusive.

14. Bobbin holder according to claim 2, which comprises means for assembling the retaining hooks onto the thread guide tube.

15. Bobbin holder according to claim 3, which comprises means for assembling the retaining hooks onto the thread guide tube.

16. Bobbin holder according to claim 13, which comprises means for assembling the retaining hooks onto the thread guide tube.

17. Bobbin holder according to claim 14, wherein the assembly means comprise, either a support, through which the thread guide tube passes and comprising at least the said retaining hooks, or a support, through which the thread guide tube passes as well as means that are part of the said support and which are each designed to receive at least one retaining hook or at least one member comprising at least one retaining hook.

18. Bobbin holder according to claim 15, wherein the assembly means comprise, either a support, through which the thread guide tube passes and comprising at least the said retaining hooks, or a support, through which the thread guide tube passes as well as means that are part of the said support and which are each designed to receive at least one retaining hook or at least one member comprising at least one retaining hook.

19. Bobbin holder according to claim 16, wherein the assembly means comprise, either a support, through which the thread guide tube passes and comprising at least the said retaining hooks, or a support, through which the thread guide tube passes as well as means that are part of the said support and which are each designed to receive at least one retaining hook or at least one member comprising at least one retaining hook.

20. Bobbin holder according to claim 1, wherein each retaining hook comprises a proximal contact zone with which the tying thread will come into contact and, in the proximal contact zone, the tangent to the hook extends in a direction forming, in relation to an axis along which the thread guide tube extends, an angle of between 30° and 45° inclusive.

\* \* \* \* \*